US012447586B2

(12) United States Patent
Alloin et al.

(10) Patent No.: US 12,447,586 B2
(45) Date of Patent: Oct. 21, 2025

(54) SCREWING/UNSCREWING TOOL SUITABLE FOR A SCREW OR A BOLT THAT IS DIFFICULT TO ACCESS, IN PARTICULAR ON A MAST OR A JIB OF A CRANE

(71) Applicant: MANITOWOC CRANE GROUP FRANCE, Dardilly (FR)

(72) Inventors: Yves Alloin, St Germain en Brionnais (FR); Olivier Gollion, Caluire et Cuire (FR); Florent Mourin, Chasselay (FR); Dominique Chambon, Charlieu (FR); Pascal Crocombette, Escoutoux (FR); Sylvain Leblan, Bully (FR)

(73) Assignee: Manitowoc Crane Group France, Dardilly (FR)

( * ) Notice: Subject to any disclaimer, the term of this patent is extended or adjusted under 35 U.S.C. 154(b) by 259 days.

(21) Appl. No.: 18/159,678

(22) Filed: Jan. 25, 2023

(65) Prior Publication Data

US 2023/0234191 A1 Jul. 27, 2023

(30) Foreign Application Priority Data

Jan. 26, 2022 (FR) ....................................... 2200668

(51) Int. Cl.
*B25B 13/00* (2006.01)
*B25B 13/48* (2006.01)

(52) U.S. Cl.
CPC .................................. *B25B 13/481* (2013.01)

(58) Field of Classification Search
CPC .... B25B 1/10; B25B 1/14; B25B 5/04; B25B 13/481; B25B 13/00
See application file for complete search history.

(56) References Cited

U.S. PATENT DOCUMENTS 2,815,052 A * 12/1957 Krasnow ................... B25B 5/08 269/239
5,584,220 A 12/1996 Darrah et al.
6,902,158 B2 * 6/2005 Yonezawa ............... B25B 5/062 269/24

(Continued)

FOREIGN PATENT DOCUMENTS

EP 1873113 A1 1/2008

OTHER PUBLICATIONS

Search Report and Written Opinion issued in connection with FR Pat. Appl. 22/00668, dated Aug. 25, 2022.

*Primary Examiner* — Lee D Wilson
(74) *Attorney, Agent, or Firm* — Cook Alex Ltd.

(57) ABSTRACT

A screwing/unscrewing tool for screwing/unscrewing a screw or a bolt includes a first part including a lever secured to a screwing/unscrewing bit provided with at least one screwing/unscrewing recess centered on a main axis, a second part including a support arm equipped with a tapped hole and on which the screwing/unscrewing bit is rotatably mounted around the main axis, and an adjustment screw screwed into the tapped hole and having a coupling head configured for a coupling with a screw-gun or a wrench, and extended by a threaded rod having a free end suitable for abutment on the lever in order to apply a pivoting force to it. The screwing/unscrewing tool may be used with a screw or bolt that is difficult to access in a crane mast or crane jib.

18 Claims, 3 Drawing Sheets

(56) References Cited

U.S. PATENT DOCUMENTS

| | | | | |
|---|---|---|---|---|
| 8,033,536 | B2 * | 10/2011 | Le Devehat | F16L 23/036 269/244 |
| 8,256,069 | B2 * | 9/2012 | Haruna | B25B 5/122 24/494 |
| 2015/0145195 | A1 * | 5/2015 | Fukui | B25B 5/122 269/32 |
| 2023/0234191 | A1 * | 7/2023 | Alloin | B25B 23/0078 |

* cited by examiner

SCREWING/UNSCREWING TOOL SUITABLE FOR A SCREW OR A BOLT THAT IS DIFFICULT TO ACCESS, IN PARTICULAR ON A MAST OR A JIB OF A CRANE

FIELD

The invention relates to a screwing/unscrewing tool, for screwing/unscrewing a screw or a bolt. It relates more particularly to a screwing/unscrewing tool suitable for a screw or a bolt that is difficult to access, for example by being housed in an enclosed space which offers a limited displacement for a tool.

The invention finds a non-limiting application for screwing and unscrewing screws or bolts used on crane masts or crane jibs, and in particular used to join end-to-end structural elements of the mast or the jib.

BACKGROUND

It is thus known, in particular from document EP 1 873 113, to use connecting screws to ensure end-to-end connections between corner chords of superimposed mast elements of a tower crane. To screw and unscrew these connecting screws, it is conventional to use a ratchet wrench, manually manipulated by an operator. Indeed, the use of an electric screw-gun (also called screwing/unscrewing device) is not possible insofar as these connecting screws are housed in depressions of the corner chords which limit or even prevent access to such a screw-gun.

However, when it is necessary to strongly tighten the screw or the bolt, to allow a good support of efforts and to guarantee a very long lifespan of the assembly thus procured, a manual screwing is particularly difficult to achieve a sufficiently high tightening torque, so that it is better to use a screw-gun. But, in certain cases, such as the one described above specific to crane masts, the location of the screw or bolt in an enclosed depression does not allow the direct use of a screw-gun, the possible access being too limited.

SUMMARY

The invention proposes a screwing/unscrewing tool which allows the screwing and unscrewing of a screw or a bolt in an enclosed space which does not allow a direct access for a screw-gun, while making it possible to reach torques of sufficiently high tightening, and for example sufficient tightening torques to meet the requirements specific to the assemblies of crane structural elements.

To this end, the invention proposes a screwing/unscrewing tool, for screwing/unscrewing a screw or a bolt, this screwing/unscrewing tool comprising a first part and a second part coupled in rotation around a main axis, and also comprising an adjustment screw, and wherein:

- the first part comprises a lever secured to a screwing/unscrewing bit provided with at least one screwing/unscrewing recess centered on the main axis;
- the second part comprises a support arm on which the screwing/unscrewing bit is rotatably mounted around the main axis, said support arm being equipped with a tapped hole; and
- the adjustment screw is screwed into the tapped hole, the adjustment screw having a coupling head configured for a coupling with a screw-gun or a wrench, and extended by a threaded rod having a free end suitable for abutment on the lever of the first part in order to apply to it a pivoting force around the main axis.

Thus, the invention proposes a screwing/unscrewing tool which is suitable for cooperating with a screw or a bolt located in an enclosed space, by coupling the screw or the bolt with the screwing/unscrewing recess of the screwing/unscrewing bit, letting the lever, the support arm and the adjustment screw protrude out of the enclosed space. Then, this screwing/unscrewing tool makes it possible to multiply the torque applied to reach the necessary torque, by means of the lever arm exerted by the lever of the first part which is pushed by the adjustment screw. This adjustment screw can be operated with an electric screw-gun, such as a battery-powered cordless screw-gun, or with a manual wrench; the lever arm offered by the lever allowing to reach a high tightening torque even with a wrench.

The invention therefore allows a simplification of the screwing and unscrewing, while allowing to reach a minimum torque applied to the screw or the bolt. The invention is in particular applicable to screws and bolts which are difficult to access, and which require significant tightening for the good holding of the assembly, in particular in an assembly of crane structural elements.

In a particular embodiment, the screwing/unscrewing bit has two opposite screwing/unscrewing recesses centered on the main axis.

Thus, a first screwing/unscrewing recess serves for screwing, and a second screwing/unscrewing recess serves for unscrewing, which makes it possible to easily use the screwing/unscrewing tool both to tighten and to loosen the screw or bolt, also making it easier to use; simply rotate it over to present one or the other of the two screwing/unscrewing recesses facing the bolt or the screw.

According to one feature, the second part has at least one bearing abutment adapted to bear on a support to block the second part in rotation during a screwing/unscrewing.

Such a bearing abutment is advantageous for blocking the second part, and therefore the support arm and the tapped hole, in order to have a static second part during screwing/unscrewing, compared to the first part which is movable.

According to a possibility, the at least one bearing abutment is in the form of a projection on the support arm.

According to another possibility, the at least one bearing abutment is provided on the support arm between the tapped hole and the screwing/unscrewing bit.

In a particular embodiment, the tapped hole and the adjustment screw are centered on a screwing axis contained in a plane orthogonal to the main axis.

According to one feature, the support arm has two opposite ends, which are a free distal end on which the tapped hole is provided, and a proximal end on which the screwing/unscrewing bit is rotatably mounted around the main axis.

According to another feature, the lever is movable into an extreme position wherein said lever is in abutment against the free distal end of the support arm and is facing the tapped hole, when the adjustment screw is retracted inside the tapped hole.

The invention also relates to a screwing/unscrewing system for screwing/unscrewing a screw or a bolt, which comprises:

- a screwing/unscrewing tool according to the invention; and
- a wrench or a screw-gun provided with a bit configured for cooperating with the coupling head of the adjustment screw, in order to be able to screw said adjustment screw into the tapped hole and thus move it in translation to push the lever and thus rotate the screwing/unscrewing bit.

The invention also concerns a screwing/unscrewing method for screwing or unscrewing a screw or a bolt by means of a screwing/unscrewing tool according to the invention, this method implementing the following steps:

- placing the screwing/unscrewing bit on the screw or the bolt;
- coupling the coupling head of the adjustment screw to a bit of a screw-gun or to a wrench;
- operating the screw-gun or rotate the wrench to screw the adjustment screw into the tapped hole and thus move it in translation to push the lever and thus rotate the screwing/unscrewing bit in the direction of screwing or unscrewing the screw or the bolt.

According to a characteristic, the screwing/unscrewing bit is placed on the screw or the bolt, with the lever in abutment against the support arm and facing the tapped hole, when the adjustment screw is retracted inside the tapped hole; which will offer the widest angular travel for the lever and therefore for the screwing/unscrewing movement.

According to another feature, the second part of the screwing/unscrewing tool bears on a support to block this second part in rotation during the screwing/unscrewing of the screw or the bolt.

In an advantageous embodiment, the screwing/unscrewing method is implemented to screw or unscrew a screw or a bolt on a mast or a jib of a crane, and in particular a screw or a bolt used in the assembly of two mast or jib structural elements.

BRIEF DESCRIPTION OF THE DRAWINGS

Other features and advantages of the present invention will appear on reading the detailed description below, of a non-limiting example of implementation, made with reference to the appended figures wherein.

DESCRIPTION

Figure 1:
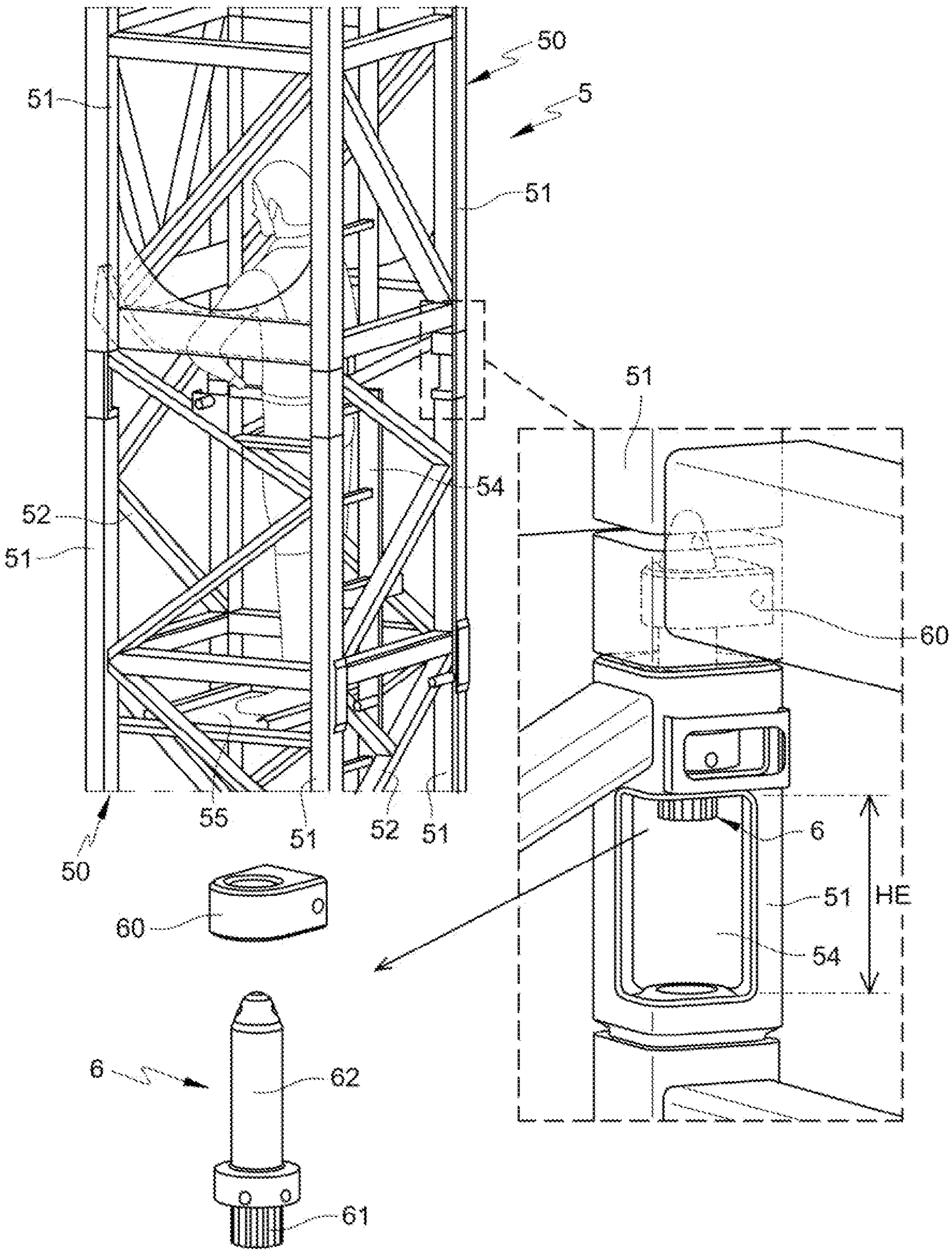
FIG. 1 is a schematic perspective view of two crane mast structural elements, superimposed on each other, and joined end-to-end by connecting screws, with a zoom on an area of connection to visualize one of the connecting screws in situation, and with an illustration of a connecting screw and an associated nut.

With reference to FIG. 1, the invention finds a non-limiting application in the field of cranes, and in particular in a mast 5 formed by an assembly of mast elements 50 superimposed and joined end-to-end. Such mast elements 50 each comprise corner chords 51 of vertical extension and interconnected by crossbeams or diagonals 52. The corner chords 51 of two superimposed mast elements 50 are fixed together, end-to-end, by connecting screws 6 cooperating with nuts 60.

These connecting screws 6, which each have a screwing head 61 extended by a threaded rod 62, are housed in depressions 53 of the corner chords 51, which have reduced heights HE, thus offering a limited vertical travel which prevents an access to a screw-gun. As visible in FIG. 1, an operator OP accesses the interior of the mast 50, equipped with an access ladder 54 and intermediate platforms 55, to come and screw the connecting screws 6 during assembly of the mast 5 and unscrew the connecting screws 6 when disassembling the mast 5.

Figure 3:
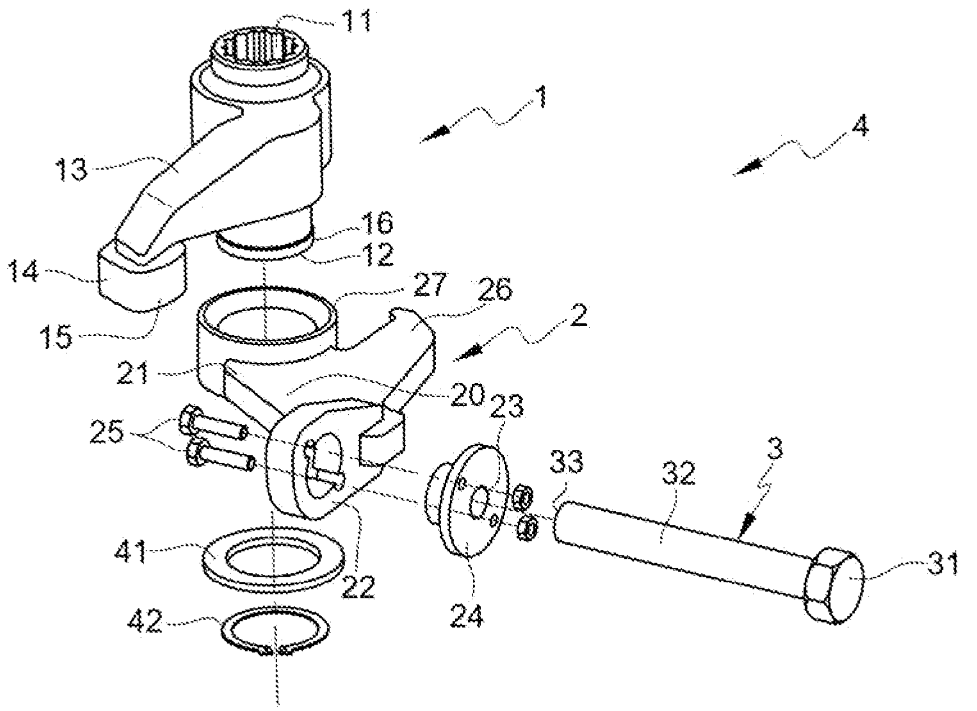
FIG. 3 is a schematic perspective and exploded view of the screwing/unscrewing tool used in the three situations of FIG. 2.

Referring to FIG. 3, a screwing/unscrewing tool 4 according to an embodiment of the invention, is particularly suitable for screwing/unscrewing the connecting screws 6 described above.

This screwing/unscrewing tool 4 mainly comprises three elements, namely a first part 1, a second part 2 and an adjustment screw 3, and wherein the first part 1 and the second part 2 are coupled in rotation around a main axis AP, and the adjustment screw 3 is screwed into or onto the second part 2.

The first part 1 comprises a screwing/unscrewing bit 10 in the form of a cylindrical sleeve centered on the main axis AP and presenting two opposite open ends, wherein each open end presents an internal profile which is complementary to the head 61 of the connecting screw 6. Thus, each open end of the screwing/unscrewing bit 10 forms a screwing/unscrewing recess 11, 12 centered on the main axis AP and adapted to cooperate with the screwing head 61 of the connecting screw 6. In other words, the screwing bit 10 has two opposite screwing/unscrewing recesses 11, 12 centered on the main axis AP, with a first recess 11 that can be used to unscrew the connecting screw 6 and a second recess 12 that can be used to screw the connecting screw 6.

The first part 1 also comprises a lever 13 secured to the screwing/unscrewing bit 10, this lever 13 projecting from the screwing/unscrewing bit 10 in a direction substantially orthogonal to the main axis AP. The lever 13 comprises a free end 14 which has a bearing surface 15.

The second part 2 comprises a support arm 20 on which the screwing/unscrewing bit 10 is rotatably mounted around the main axis AP, this support arm 20 being equipped with a tapped hole 23 wherein the adjustment screw 3 is screwed; this tapped hole 23 being centered on a screw axis 30 contained in a plane orthogonal to the main axis AP.

More specifically, this support arm 20 has two opposite ends 21, 22, which are:

- a proximal end 21 which supports a cylindrical sleeve 27 centered on the main axis AP, and inside which the screwing/unscrewing bit 10 is rotatably mounted around the main axis AP; and
- a free distal end 22 on which the taped hole 23 is provided.

The support arm 20 thus protrudes from the cylindrical sleeve 27 and extends substantially in a plane orthogonal to the main axis AP. The screwing/unscrewing bit 10 is in a pivot connection in the cylindrical sleeve 27, and it is blocked in translation, for example by means of a ring 41 associated with a circlip 42 which is caught inside a groove 16 of the screwing/unscrewing bit 10.

The free distal end 22 has an orifice inside which a sleeve 24 is fastened, for example by means of screws 25, wherein this sleeve 24 internally defines the tapped hole 23. Alternatively, the tapped hole is formed directly in the free distal end 22.

The second part 2 has a bearing abutment 26 which is in the form of a projection on the support arm 20, and in particular of a hook-configured projection, between the proximal end 21 and the distal free end 22, therefore between the cylindrical sleeve 27 and the tapped hole 23.

Figure 2:
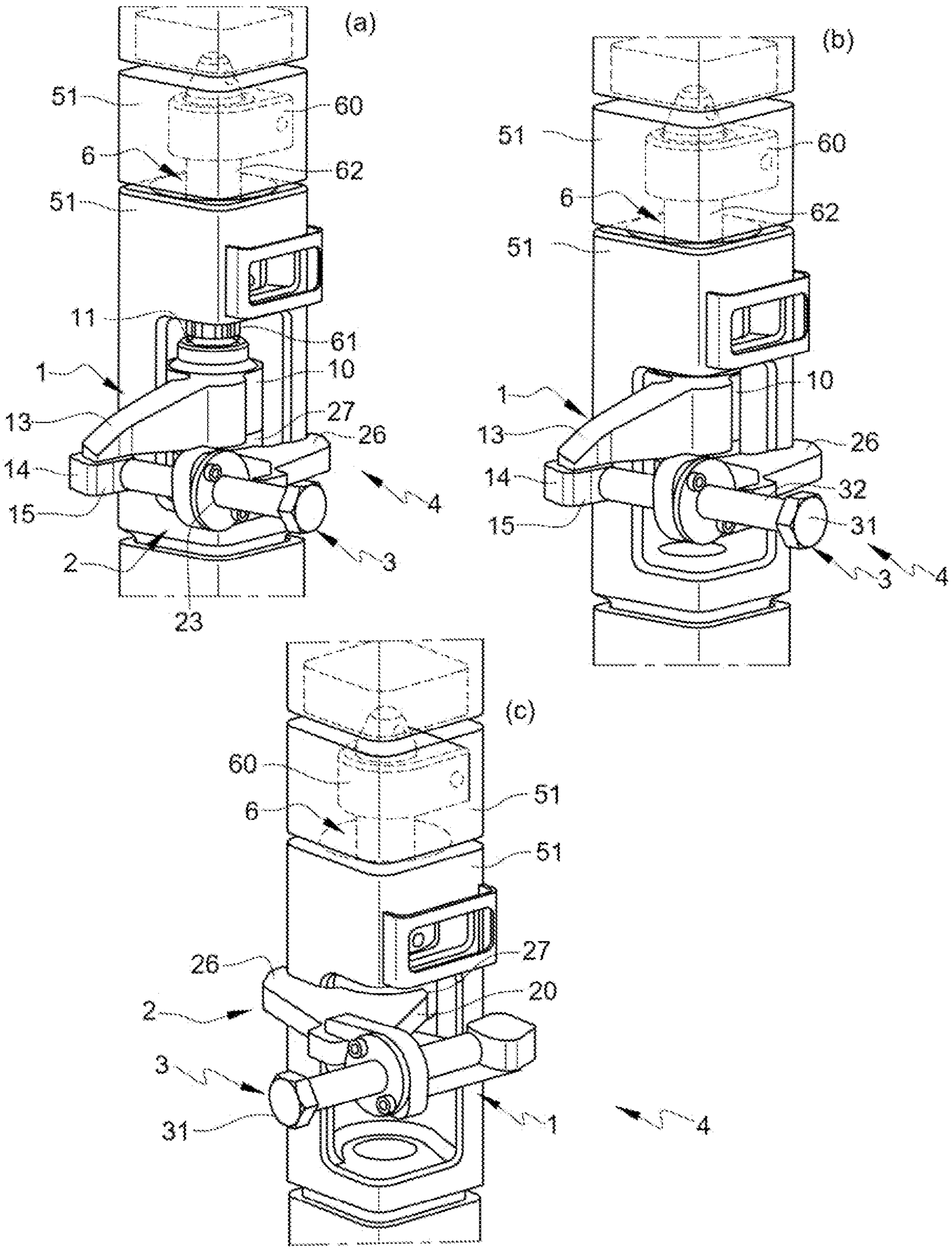
FIG. 2 is a schematic view of a screwing/unscrewing tool according to the invention on the two structural elements of FIG. 1, in three situations which are a first situation (a) of inserting the screwing/unscrewing tool on a connecting screw which must be unscrewed, a second situation (b) of using the screwing/unscrewing tool to unscrew the connecting screw (loosening direction), and a third situation (c) of using the screwing/unscrewing tool to screw the connecting screw (tightening direction)
Figure 4:
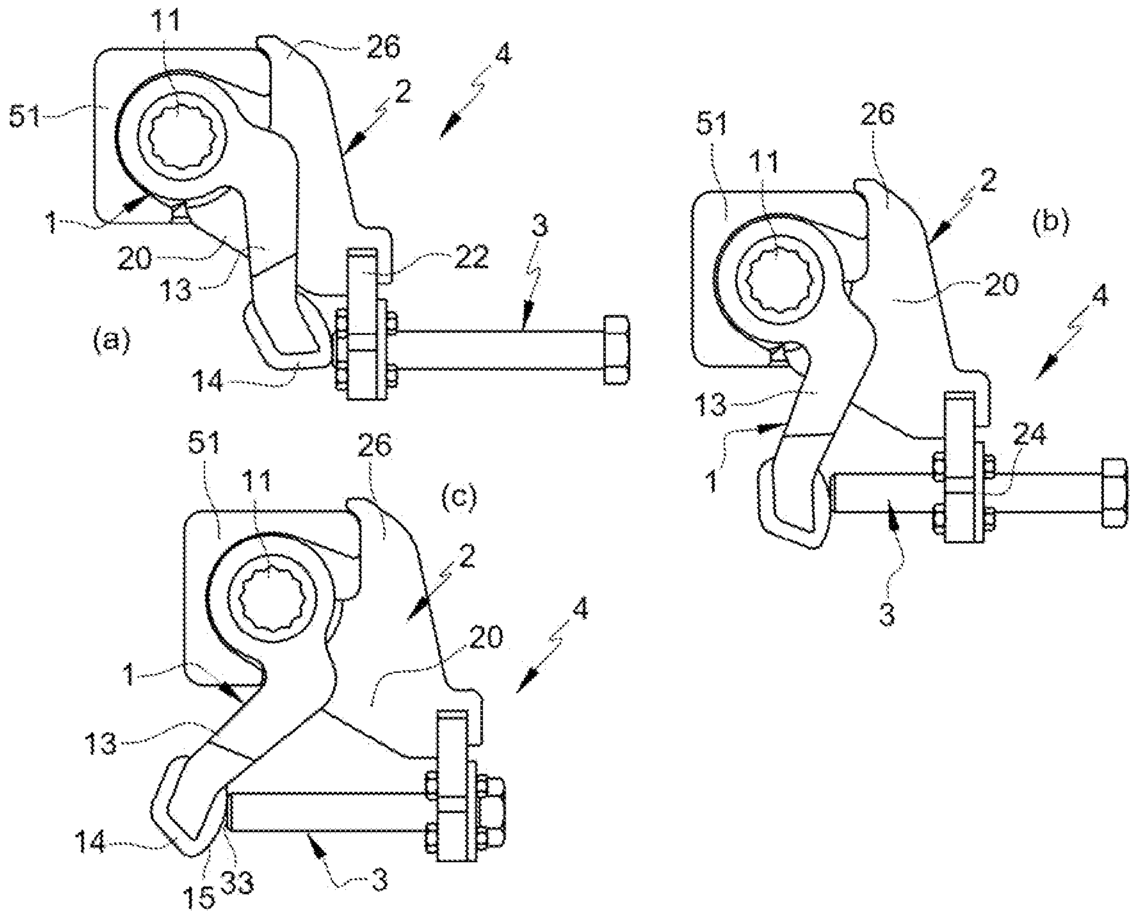
FIG. 4 is a schematic top view of the screwing/unscrewing tool at three moments of the unscrewing of a connecting screw, on the two structural elements of FIG. 1, with a first moment (a) at the beginning of the unscrewing, a second moment (b) in the middle of the unscrewing, and a third moment (c) at the end of the unscrewing.

As visible in FIG. 2 and in FIG. 4, this bearing abutment 26 is configured to bear on a support (such as a corner chord 51) to block the second part 2 in rotation during a screwing/unscrewing.

The adjustment screw 3 is screwed into the tapped hole 23 and is therefore also centered on the screwing axis 30. This adjustment screw 3 has:

- a coupling head 31 configured for a coupling with a screw-gun or a wrench, and
- a threaded rod 32 which extends the coupling head 31 and which ends by a free end 33 suitable for abutment on the lever 13 of the first part 1, and more specifically on the bearing surface 15 of its free end 14, in order to apply to it a pivoting force around the main axis AP.

When the adjustment screw 3 is retracted inside the tapped hole 23, and does not protrude from the side of the lever 13, the lever 13 can be moved into an extreme position wherein the bearing surface 15 abuts against the free distal end 22 of the support arm 20 and is facing the tapped hole 23.

The following description relates to a screwing/unscrewing method for screwing or unscrewing the connecting screw 6 by means of the screwing/unscrewing tool 1.

This method begins by placing the screwing/unscrewing bit 10 on the connecting screw 6, by engaging one of the two screwing/unscrewing recesses 11, 12 on the screwing head 61 of the connecting screw 6.

In the examples of FIGS. 2(*a*) and 2(*b*) and of FIG. 4, the first recess 11 is engaged to unscrew the connecting screw 6. In the example of FIG. 2(*c*), the second recess 12 is engaged for screwing the connecting screw 6. Between the two configurations, the screwing/unscrewing tool 1 is rotated 180 degrees.

Preferably, at this stage, the lever 13 is in its extreme position, with the adjustment screw 3 unscrewed and retracted inside the tapped hole 23.

Moreover, the bearing abutment 26 of the second part 2 bears against the corner chord 51 to block the second part 2 in rotation during the screwing/unscrewing of the connecting screw 61. Depending on whether the connecting screw 61 is unscrewed or screwed, and therefore depending on whether the first recess 11 or the second recess 12 is engaged on the connecting screw 6, the bearing abutment 26 does not bear on the same area of the corner chord 51.

The method continues by coupling the coupling head 31 of the adjustment screw 3 to a bit of a screw-gun or to a wrench (not shown), then by operating the screw-gun or rotating the wrench to tighten the adjustment screw 3 in the tapped hole 23, and thus to move this adjustment screw 3 in translation, so that its free end 33 bears against the bearing surface 15 to push the lever 13, and thus to rotate the lever 13 and the screwing/unscrewing bit 10 in the direction of screwing or unscrewing the connecting screw 6. The operations are repeated enough times to screw or unscrew the connecting screw 6.

The invention claimed is:

1. A screwing/unscrewing tool, for screwing/unscrewing a screw or a bolt, the screwing/unscrewing tool comprising a first part and a second part coupled in rotation around a main axis, and comprising an adjustment screw, and wherein:

- the first part comprises a lever secured to a screwing/unscrewing bit provided with at least one screwing/unscrewing recess centered on the main axis;
- the second part comprises a support arm on which the screwing/unscrewing bit is rotatably mounted around the main axis, said support arm being equipped with a tapped hole; and
- the adjustment screw is screwed into the tapped hole, the adjustment screw having a coupling head configured for a coupling with a screw-gun or a wrench, and extended by a threaded rod having a free end suitable for abutment on the lever of the first part in order to apply a pivoting force to the lever around the main axis, and wherein the tapped hole and the adjustment screw are centered on a screwing axis contained in a plane orthogonal to the main axis.

2. The screwing/unscrewing tool according to claim 1, wherein the screwing/unscrewing bit has two opposite screwing/unscrewing recesses centered on the main axis.

3. The screwing/unscrewing tool according to claim 1, wherein the second part has at least one bearing abutment adapted to bear on a support to block in rotation the second part during a screwing/unscrewing.

4. The screwing/unscrewing tool according to claim 3, wherein the at least one bearing abutment is in the form of a projection on the support arm.

5. The screwing/unscrewing tool according to claim 3, wherein the at least one bearing abutment is provided on the support arm between the tapped hole and the screwing/unscrewing bit.

6. The screwing/unscrewing tool according to claim 1, wherein the support arm has two opposite ends, including a free distal end on which the tapped hole is provided, and a proximal end on which the screwing/unscrewing bit is rotatably mounted around the main axis.

7. The screwing/unscrewing tool according to claim 6, wherein the lever is movable into an extreme position wherein the lever is in abutment against the free distal end of the support arm and is facing the tapped hole, when the adjustment screw is retracted inside the tapped hole.

8. A screwing/unscrewing system for screwing/unscrewing a screw or a bolt, the screwing/unscrewing system comprising:

- a screwing/unscrewing tool comprising
  - a first part and a second part coupled in rotation around a main axis, and comprising an adjustment screw, and wherein
    - the first part comprises a lever secured to a screwing/unscrewing bit provided with at least one screwing/unscrewing recess centered on the main axis;
    - the second part comprises a support arm on which the screwing/unscrewing bit is rotatably mounted around the main axis, said support arm being equipped with a tapped hole; and
    - the adjustment screw is screwed into the tapped hole, the adjustment screw having a coupling head configured for a coupling with a screw-gun or a wrench, and extended by a threaded rod having a free end suitable for abutment on the lever of the first part in order to apply a pivoting force to the lever around the main axis, and wherein the tapped hole and the adjustment screw are centered on a screwing axis contained in a plane orthogonal to the main axis; and the wrench or the screw-gun provided with a bit configured for cooperating with the coupling head of the adjustment screw, in order to be able to screw the adjustment screw into the tapped hole and thus moving the adjustment screw in translation to push the lever and thus rotate the screwing/unscrewing bit.

9. A screwing/unscrewing method for screwing or unscrewing a screw or a bolt with a screwing/unscrewing tool comprising a first part and a second part coupled in rotation around a main axis, and comprising an adjustment screw, and wherein the first part comprises a lever secured to a screwing/unscrewing bit provided with at least one screwing/unscrewing recess centered on the main axis, the second part comprises a support arm on which the screwing/unscrewing bit is rotatably mounted around the main axis, said support arm being equipped with a tapped hole, and the adjustment screw is screwed into the tapped hole, the adjustment screw having a coupling head configured for a coupling with a screw-gun or a wrench, and extended by a threaded rod having a free end suitable for abutment on the lever of the first part in order to apply a pivoting force to the lever around the main axis, and wherein the tapped hole and the adjustment screw are centered on a screwing axis contained in a plane orthogonal to the main axis, the screwing/unscrewing method comprising:

placing the screwing/unscrewing bit on the screw or the bolt;

coupling the coupling head of the adjustment screw to a bit of a screw-gun or to a wrench; and operating the screw-gun or rotate the wrench to screw the adjustment screw into the tapped hole and thus move the adjustment screw in translation to push the lever and thus rotate the screwing/unscrewing bit in the direction of screwing or unscrewing the screw or the bolt.

10. The screwing/unscrewing method according to claim 9, wherein the screwing/unscrewing bit is placed on the screw or the bolt, having the lever in abutment against the support arm and facing the tapped hole, when the adjustment screw is retracted inside the tapped hole.

11. The screwing/unscrewing method according to claim 9, wherein the second part of the screwing/unscrewing tool is bearing on a support to block in rotation said second part during the screwing/unscrewing of the screw or the bolt.

12. The screwing/unscrewing method according to claim 9, wherein the screwing/unscrewing method is implemented to screw or unscrew a screw or a bolt on a mast or a jib of a crane.

13. The screwing/unscrewing system according to claim 8, wherein the screwing/unscrewing bit has two opposite screwing/unscrewing recesses centered on the main axis.

14. The screwing/unscrewing system according to claim 8, wherein the second part has at least one bearing abutment adapted to bear on a support to block in rotation the second part during a screwing/unscrewing.

15. The screwing/unscrewing system according to claim 14, wherein the at least one bearing abutment is in the form of a projection on the support arm.

16. The screwing/unscrewing system according to claim 14, wherein the at least one bearing abutment is provided on the support arm between the tapped hole and the screwing/unscrewing bit.

17. The screwing/unscrewing system according to claim 8, wherein the support arm has two opposite ends, including a free distal end on which the tapped hole is provided, and a proximal end on which the screwing/unscrewing bit is rotatably mounted around the main axis.

18. The screwing/unscrewing system according to claim 17, wherein the lever is movable into an extreme position wherein the lever is in abutment against the free distal end of the support arm and is facing the tapped hole, when the adjustment screw is retracted inside the tapped hole.

* * * * *